United States Patent [19]

Kaltenbach et al.

[11] 4,263,352

[45] Apr. 21, 1981

[54] AQUEOUS DISPERSION COATING COMPOSITION AND APPLICATION TO MOLDED ARTICLES

[75] Inventors: Thomas F. Kaltenbach, Westland; John G. Martyn, Huntington Wood, both of Mich.

[73] Assignee: Grow Group, Inc., New York, N.Y.

[21] Appl. No.: 64,024

[22] PCT Filed: Jul. 23, 1979

[86] PCT No.: PCT/US79/00526

§ 371 Date: Jul. 23, 1979

§ 102(e) Date: Jul. 23, 1979

[87] PCT Pub. No.: WO80/00447

PCT Pub. Date: Mar. 20, 1980

[22] Filed: Jul. 23, 1979

Related U.S. Application Data

[63] Continuation-in-part of Ser. No. 935,168, Aug. 21, 1978, abandoned.

[51] Int. Cl.$^3$ .......................... B05D 3/02; C08L 63/00
[52] U.S. Cl. ............................ 427/379; 260/29.2 EP; 260/29.2 TN; 260/29.6 NR; 427/386; 427/389.7; 427/389.8; 427/412.5
[58] Field of Search ................ 260/29.2 EP, 29.6 NR, 260/40 R, DIG. 53, 42.18, 29.2 TN; 427/386, 385 A, 390 A, 407 G, 394, 375, 372 R, 379, 381, 378; 264/129; 428/413, 423

[56] References Cited

U.S. PATENT DOCUMENTS

| | | | |
|---|---|---|---|
| 3,787,230 | 1/1974 | Hoffman et al. | 427/420 X |
| 4,009,133 | 2/1977 | Jones | 260/29.2 TN |
| 4,026,857 | 5/1977 | Brown et al. | 260/29.4 R |
| 4,061,618 | 12/1977 | Stanley et al. | 260/29.2 TN |
| 4,081,578 | 3/1978 | van Essen et al. | 427/385 B X |
| 4,122,055 | 10/1978 | Tugukuni et al. | 260/29.4 UA |

FOREIGN PATENT DOCUMENTS

| | | | |
|---|---|---|---|
| 45-1754 | 1/1970 | Japan | 260/29.2 EP |
| 878139 | 9/1961 | United Kingdom | 260/29.2 EP |
| 1122414 | 8/1968 | United Kingdom | 260/29.2 EP |

*Primary Examiner*—Ronald H. Smith
*Assistant Examiner*—Thurman K. Page
*Attorney, Agent, or Firm*—Burton, Parker & Schramm

[57] ABSTRACT

Described is an aqueous dispersion coating composition consisting essentially of an epoxy powder paint and a water carrier wherein the water has dissolved therein a water soluble nonionic surfactant in an amount ranging from about 0.01 to about 10% by weight (PBW) of the dry epoxy material and a dispersing agent in an amount from about 0.01 to 10 PBW of the dry epoxy material, wherein the pigment volume concentration of the coating composition is at least 10. Also described is a method of coating formed fiber reinforced plastics, such as sheet molding compound.

14 Claims, No Drawings

AQUEOUS DISPERSION COATING COMPOSITION AND APPLICATION TO MOLDED ARTICLES

CROSS REFERENCE TO RELATED CASE

This application is a continuation-in-part of U.S. Ser. No. 935,168, filed Aug. 21, 1978 abandoned, herein incorporated by reference.

DESCRIPTION

BACKGROUND OF THE INVENTION

The present invention is concerned with aqueous dispersion coating compositions and in the application of said coating compositions to FRP (fiber reinforced plastics).

FRP is generally a mixture of resin compound and reinforcing fibers, principally glass fibers and is generally formed into a sheet molding compound (SMC) or a bulk molding compound (BMC). It is the SMC or BMC which is compression molded to form the desired part or substrate. FRP is described in British Pat. No. 1,457,935 and U.S. Pat. No. 4,081,578, which are hereby incorporated by reference.

U.S. Pat. No. 3,787,230 teaches the application of powder paint in an aqueous slurry applied to an article when the powder paint is substantially uniformly suspended.

Industry has been particularly interested in obtaining coating compositions that are environmentally safe and produce little or no emissions to the atmosphere. A particularly vexatious problem has been the application of coating compositions to FRP as SMC to produce a film which is substantially free of pin holes.

SUMMARY OF THE INVENTION

The present invention is concerned with aqueous dispersion coating composition consisting essentially of a particulate film forming epoxy composition with a pigment volume concentration (PVC) of at least 10 in a water carrier wherein the water carrier has dispersed therein a nonionic surfactant in an amount ranging from about 0.01 to about 10% by weight (hereinafter PBW) of the total coating composition; and an organic dispersing agent in an amount from about 0.01 to about 10 PBW. The coating composition is applied to FRP such as SMC.

DESCRIPTION OF PREFERRED EMBODIMENTS

The coating compositions of the present invention are applicable towards all nonwater soluble epoxy coating compositions. Suitable epoxy materials are epoxy resins obtained by reacting a dihydric phenol and a epihalohydrin. Suitable reactants include bis(4-hydroxy phenyl) dimethyl methane and epichlorohydrin. Other suitable dihydric phenols include resorcinol; 1,1-bis(4-hydroxy phenyl) ethane; 1,1-bis(4-hydroxy phenyl) propane; 1,1-bis(4-hydroxy phenyl) butane; 2,2-bis(4-hydroxy phenyl) butane; and 1,1-bis(4-hydroxy phenyl) 2 methyl propane. Typical epoxy resins are those having an epoxy equivalent of between about 650 and 1000. It is preferred that the epoxy material be a solid at ambient temperature and pressure. Illustrative commercial resins that are suitable in the practice of the invention include the following:

| Epoxy Resin | Epoxide Equivalent Weight (Approximate) | Durrans Softening Point (Approximate) |
|---|---|---|
| Epi-Rez 530 C | 900 | 95–100° C. |
| Epon 1004 | 900 | 100° C. |
| Ciba Giegy 7014 | 770 | 94° C. |

It is to be appreciated that the phrase "epoxy" is meant to include those resins that contain the oxirane ring in the coating composition. It is preferred that the epoxy compound employed be polymeric and that it contain more than 1 epoxy group per molecule, that is, that it have an epoxy equivalent greater than 1. Higher molecular weight epoxy materials can be obtained by reacting the polyglycidyl ether described above with a polyphenol, such as bisphenol-A.

While the polyglycidyl ethers of polyphenols may be employed per se, it is frequently desirable to react a portion of the reactive sites (for example, hydroxyl or in some instances epoxy) with a modifying material to vary the film characteristics of the resin. For example, the polyepoxide can be esterified with carboxylic acid, especially fatty acid. Especially preferred are saturated fatty acids.

Another useful class of polyepoxide is produced from Novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-propylene glycol, 1,5-pentanediol, 1,2,6-hexanetriol, glycerol, bis(4-hydroxycyclohexyl)2,2-propane and the like. There can also be used polyglycidyl esters of polycarboxylic acids, which are produced by the reaction of epichlorohydrin or similar epoxy compounds with an aliphatic or aromatic polycarboxylic acid such as oxalic acid, succinic acid, glutaric acid, terephthalic acid, 2,6-naphthylene dicarboxylic acid, dimerized linolenic acid and the like. Examples are glycidyl adipate and glycidyl phthalate. Also useful are polyepoxides derived from the epoxidation of an olefinically unsaturated alicyclic compound. Included are diepoxides comprising in part one or more monoepoxides. These polyepoxides are nonphenolic and are obtained by the epoxidation of alicyclic olefins; for example, by oxygen and selected metal catalysts, by perbenzoic acids, by acetaldehyde monoperacetate, or by peracetic acid, and/or hydrogen peroxide. Among such polyepoxides are the epoxy alicyclic ethers and esters which are well known in the art.

A class of polyepoxides which may be employed is acrylic polymers containing epoxy groups. Preferably these acrylic polymers are polymers formed by copolymerizing an unsaturated epoxy-containing monomer, such as, for example, glycidyl acrylate or methacrylate, a hydroxyl-containing unsaturated monomer and at least one other unsaturated monomer.

Another class of epoxies are the cycloaliphatic epoxies whereby a saturated cycloaliphatic ring (e.g. 5 or 6 members) is fused to an oxirane ring, such as the bicyclo[4,1,0]-heptane-7-oxy or the bicyclo[3,1,0]-hexane-6-oxy.

The dispersion coating composition of the present invention can best be described as powder paint dispersion. By "dispersion" is meant that particulates within a range of about 1 to about 100 microns are present and uniformly dispersed in the water carrier. Fine particles are employed so that thin films (less than 4 mils) may be produced. If very large particles are used, then smooth thin films would not be obtained. By "powder paint" is meant a particulate that contains all of the components necessary for a paint composition and may be obtained by removing the solvent from a liquid paint, such as that containing a film former, cross-linking agent, pigments and the like, to obtain the solid paint particles, such as in accordance with U.S. Pat. No. 3,737,401, hereby incorporated by reference. Other methods such as spray dry, melt mix (extrusion) or ball mill may also be used to produce "powder paint".

The epoxy material may be solubilized with any organic solvent which can be properly operable within the processing parameters in forming the powder paint particles from the liquid paint as taught in U.S. Pat. No. 3,737,401. Suitable water soluble solvents are Cellosolve (trademark of Union Carbide for ethyl ether of ethylene glycol), methyl Cellosolve, ethyl Cellosolve, butyl Cellosolve and the alkyl esters thereof, such as acetates and the like, Carbitol (trademark of Union Carbide for the monoethyl ether of diethylene glycol), methyl Carbitol, butyl Carbitol, hexyl Carbitol, and other organic alcohols, esters, ketones and the like. Of the above enumerated solvents, methyl Cellosolve is preferred.

An important aspect to the coating composition of the present case is the utilization of pigments which give a high covering. It has been found desirable to employ pigments such as titanium dioxide, alkaline earth metal carbonates, sulfates, and silicates, and the like, for example, barium, calcium or magnesium sulfate, carbonate or silicate, clay, limestone, carbon black and other pigments, such as the chromates, dyes, coloring agents, mordants, fillers and the like, lithopone, which is a white pigment consisting of zinc sulfide and barium sulfate.

It is preferred that the pigment volume concentration (PVC) be at least about 10 and more preferably at least 25. By "PVC" is meant the volume of the pigment in the dried paint film, i.e., the volume of pigment divided by the total volume of the solids of the coating composition. The proper PVC is followed in order to get the proper rheology during baking or curing of the coating composition. The correct amount of PVC prevents the coating composition from flowing too much during cure. The correct amount of PVC allows control of the flowing of the composition.

It is preferred that the epoxy coating composition be a thermosetting coating composition wherein there is a cross-linking agent employed. While a variety of cross-linking agents may be employed, such as the melamine type, it is preferred that the cross-linking agent be an isocyanate and in particular a blocked isocyanate. Other cross-linking agents may be used, such as urea formaldehyde, phenol formaldehyde, benzoguanamine, amide-imide, polyamide, polybenzimidazole and the like. Suitable isocyanates that may be employed are the aromatic isocyanates, the aliphatic isocyanates, isophorone diisocyanates and the like. For a suitable listing of polyisocyanates attention may be directed towards U.S. Pat. No. 3,843,593 patent, such as those cited in Columns 7-9.

In addition, the organic polyisocyanate may be a prepolymer derived from a polyol including polyether glycol or polyester polyol, or simple polyols, such as glycols, for example, ethylene glycol and propylene glycol as well as other polyols, such as glycerol, trimethylolpropane, hexanetriol, pentaerythritol, and the like, as well as monoethers, such as diethylene glycol, tripropylene glycol, and the like, and the polyethers, that is, alkaline oxide condensates of the above. For a suitable recitation of such organic polyisocyanates, attention may be directed towards German patent application No. 2,531,906, which is hereby incorporated by reference.

A number of blocking agents may be used to produce the blocked isocyanate which could be used as the cross-linking agent in the present case. Such blocking agents as the phenol type, lactone type, active methylene type, alcohol type, mercaptan type, acid amide type, imide, the amine type, the urea type, carbamate type, oxime type, sulfate and the like. Most preferably, a ketoxime type is preferred, and even more preferably, a dialkyl ketoxime of from 1 to 4 carbon atoms per alkyl group. Most preferably, the blocked isocyanate is an isophorone diisocyanate blocked with an oxime available from Cargill under the trade name Powder Coating Curing Agent 2400. After the liquid paint (epoxy, and cross-linking agent and pigments), hereinafter called the base material, has been prepared, it may be injected into an agitated deionized water bath through an airless type nozzle such as a Spraying System Company Teejet Nozzle SS000067 (orifice diameter 0.023"-0.058 mm). The particle size range and distribution may be controlled by the viscosity, type of solvent and solids of the paint, as well as the size and position of the nozzle, the shape of the agitator and the speed of the agitator which is used to agitate the deionized water. The agitation is useful in order to produce the powder paint particles pursuant to U.S. Pat. No. 3,737,401. After the paint has been dispersed as droplets in the water, it is stirred to effect a transfer of solvents into the water from the droplets. The precipitated paint is separated from the solvent water mixture and rinsed in clear deionized water to remove the remaining solvents present. The powder is then separated from the liquid using conventional filtration techniques.

The wet powder paint may be dried and used as a powder to be inserted into the aqueous carrier containing the other components as described below or the wet powder may be dispersed in a water medium similar to that described below.

After the powder has been obtained or using the wet cake from the process described above, the final coating composition may be obtained. It has been found desirable to add a water soluble high boiling material which is a non-solvent for the epoxy resin. A preferred material is a glycol such as a diethylene glycol, a triethylene glycol, and the like, which is to prevent caking of the powder upon the loss of water at ambient temperatures. Thus, an aqueous powder dispersion splashed on the sides of containers may be reincorporated into the body of the material. The high boiling material is present in an amount of about 0.5 to about 15% by weight of the dry powder.

During the formulation of the aqueous coating composition, a nonionic water soluble surfactant is employed to enable the liquid portion of a material to wet the powder more readily. This is present generally in the range of about 0.1 PBW to about 10 PBW of the dry powder concentration. Suitable nonionic surfactants are sorbitan fatty acid esters, polyethoxylated sorbitol fatty acid esters, polyethoxylated fatty acid esters, polyethoxylated alcohol ethers, glycerol fatty acid esters, propylene glycol fatty acid esters, polyoxyethylene derivatives of castor oil, polyethoxylated alkyl phenyl ethers, alkyl esters of phosphoric acid, and polyethoxylated esters of phosphoric acid.

It is also deemed necessary to have a dispersing agent present in an amount from about 0.01 to about 10 PBW of the dry powder concentration. By "dispersing agent" is meant a water soluble material that is added to the powder paint water dispersion, that is attracted to the epoxy particulate in dispersion or suspension in the water carrier and by means of a charge prevents agglomeration of the particle. While Applicants do not wish to be bound to any theory, it is believed that the utilization of the dispersing agent forms a Helmholtz double layer around the epoxy particle and that in turn prevents agglomeration of the particles. Preferred dispersing agents are anionic polymeric type dispersing agents, such as Tamol (trademark of Rohm & Haas for an acrylic polymeric dispersing agent). Other anionic dispersing agents may be lecithin, water soluble salts of alkyl sulfates, salts of polyethoxylated alkyl ether sulfates, water soluble phosphates, such as tetrasodium pyrophosphate, trisodium polyphosphate and the like.

Optionally, it has been found desirable to add a defoamer to control the formation of bubbles. The presence of bubbles in the final product is unacceptable from the packaging standpoint as well as the possibility of interference with the continuity of the final film. The range of defoamer material employed generally is of the order of 0.5 to about 3 PBW based on the dry powder coating and this will vary with the surfactants described above. A suitable defoamer is a product by the name of Nalco 2341, trademark for a silica containing organic material.

The pH of the coating composition should be on the basic side, preferably from about 8 to 12, and even more preferably, from about 8.0 to about 9.5, most preferably, about 8.3. An amine or other basic compound is employed to insure the basic pH of the system. The amine is added in an amount generally in the range of about 0.1 to about 15 PBW depending upon the nature of the powder and the other surfactants that are employed. Suitable organic amines are those having a boiling point greater than 100° C., such as dimethylethanol amine, dipropanol amine and the like.

It has been found desirable to add thickeners in an amount of about from 0.1 to about 10 PBW of the dry powder depending upon the powder solids concentration of the final dispersion, the nature of the powder and the particle size distribution of the powder in the final product. The concentration can be adjusted to give the desired flow as required. In addition, the thickener may act as an antisettling agent. Such thickeners may be water solubilized polyacrylic acids, polyurethanes, cellulosics or other highly polymeric materials or gel forming materials as modified Bentonite clays and the like.

It has been advantageous to hold the addition of a material used to adjust the pH until the last and a dispersing agent next to last in order to mix the other components thoroughly before activation of the bodying agents.

After the liquid portion of the final coating composition is prepared, the powder cake or dry powder is added under agitation. As with most incorporation of solids into liquids, the addition must be adjusted to the rate at which the powder is wet out to avoid an unmanageable agglomeration.

Agitation is continued until the mixture becomes relatively smooth and fluid. Care must be exercised to avoid increasing the temperature of the mixture to a point leading to instability of the dispersion. This temperature varies, but for the material described herein, it is about 100° F.

An aqueous powder dispersion such as that described herein has been further ground using either an Attritor (trademark of the Attritor Company for a piece of equipment which provides for fast, fine grinding) or a shotmill. In the laboratory, a water cooled stainless steel beaker, four millimeter glass beads and a steel disc attached to a shaft of a high speed agitator, has been used for further grinding. The specific material performs well at either a grind of 4½ or 6½ Hegeman (ASTM D1210-64) since in normal use, there is a primer that is applied over it prior to top coat application.

The aqueous powder dispersion described herein may be applied by any conventional technique, such as dipping, spraying and the like, although spraying is preferred.

The coating composition of the present invention is preferably applied to SMC, which is an abbreviation for sheet molding compound. SMC, when molded, is a very firm plastic material which has among its components fiberglass reinforcement and a thermosetting polyester. The polyester may be prepared by reacting phthalic anhydride (2 parts), maleic anhydride (1 part) and dipropylene glycol (10% excess). The polyester resulting from the former reaction is diluted with styrene, vinyl toluene or diallyl phthalate on a ratio of 1:2 parts of the polyester per part of the unsaturated compound. The composition is polymerized with an appropriate catalyst such as a peroxide.

The polymerized material then has about 30% by weight of fiberglass added thereto. This composition is then molded and cured under high pressure at about 350° F. It has also been found desirable to add filler components such as asbestos, sisal, talc, calcium carbonate, Barytes (barium sulfate), hollow glass spheres, carbon and the like.

During the molding and curing of the FRP or SMC material, gas is trapped between the pockets of the formed plastic. Previously when top coat coating compositions were applied and baked, a gaseous problem occurred for the gas within the pockets was released at the high curing temperature of the prior art coating composition. Also, distorted shapes were obtained as a result of the high cure temperature.

Now, however, due to the curing process described further below of the coating composition of the present case, gasing is substantially eliminated for SMC materials and pin holes in the top coat are substantially eliminated.

The process for curing the coating composition in the present application is performed when SMC is a substrate by applying the coating composition normally at ambient temperature, flashing off the water at a temperature of about 100° F. to 212° F. (100° C.), preferably at 125° F., for a short period of time, generally ranging from about 1 to about 20 minutes, and then raising the temperature to curing normally at a temperature range of about 300° F. (148.9° C.) to about 400° F. (204.4° C.) for a period of time of about 1 to about 30 minutes. It has been possible to cure the coating at a temperature as low as 250° F. (121.1° C.) for 15 minutes using a curing agent for epoxy materials supplied by Ciba Geigy identified as XU232 which is a solid powder at ambient temperature and is an adduct of an amine and a glycidyl ether. After the water has been flashed in the preliminary heating step, the powder components are present on the SMC as particulates. The film formed by the powder has not begun to flow because the temperature is sufficiently low thereby resulting in what is, in essence, a non-continuous coating of the paint particles. When the temperature is increased, the air that may be trapped in the SMC substrate may escape. As the curing of the coating composition occurs, the epoxy powder flows out into a continuous film from the non-continuous film in which the epoxy material was previously. As the curing temperature is reached, a continuous film of epoxy based coating covers the SMC substrate.

The sheet molding compound that may be employed is both regular and low density and may contain glass spheres or fibers. The thickness of the aqueous coating composition in the wet state is about 1 to about 10 mils, preferably about 4 mils. The prebaking temperature is 120° F. for about 10 minutes.

After curing, the part may be coated with either a sheet metal primer, which is preferred, or a coating material as is usually used as a top coat for industrial objects. Any well known primer or top coat can be used.

EXAMPLE

A coating composition was prepared from a base material described below formulated from the following components:

| Component | PBW |
|---|---|
| Carbon Black | 0.25 |
| Titanium Dioxide | 5.13 |
| Lithopone | 12.29 |
| Clay | 12.29 |
| Talc | 4.19 |
| Epoxy Resin (Ciba Geigy 7014) | 18.53 |
| Methyl Cellosolve | 40.12 |
| Blocked Isocyanate (Cargill 2400) | 4.66 |
| Methylethyl Ketone | 2.31 |
| Modaflow (trademark of Monsanto for polyacrylic flow control agent) | 0.23 |
| | 100.00 |

This composition was ground to a 5 Hegeman reading.

The coating composition described above was formulated from the liquid paint state to a dry particulate by adding 17200 PBW of the above composition to 335000 PBW of deionized water by spraying the liquid paint under the surface of the deionized water onto a rotating Shar blender saw tooth blade where the orifice of the nozzle from which the liquid paint is spraying is 0.023 inches. The blade was rotating at 4700 linear ft./min. The time for passing the liquid paint through the orifice was about 4 minutes at a rate of speed of 1 gal./min. The particles produced were fine, gritty materials which were filtered from the water by means of a vacuum filter, reintroduced into another bath containing an equal quantity of deionized water in order to remove additional solvents and those particles again are filtered by means of moving belt vacuum filter. The powder cake having 44% nonvolatiles was then treated below.

The final coating dispersion composition was prepared from the following components:

| Components | PBW |
|---|---|
| Dry Base Computed From Solids Run on Above Cake | 35.25 |
| Deionized Water | 60.22 |
| Diethylene Glycol | 1.76 |
| Tergitol TMN-6 (trademark of Union Carbide for a nonionic surfactant, liquid at ambient temperature containing trimethyl nonyl polyethylene glycol ether obtained by reacting trimethyl nonanol and 6 moles of ethylene oxide with a calculated HLB# of 11.7) (90% Concentration) | 0.05 |
| BORSCH GEL L75 (trademark of BORCHERS A.G. for a urethane thickener) | 0.35 |
| Defoamer (NALCO 2341) | 0.04 |
| Polyacrylic Acid Thickener | 0.71 |
| Dimethylethanol Amine | 0.21 |
| Dispersing Agent Tamol 731 (25% concentration) | 1.41 |

The coating composition in dispersed state (having 35% pigment:volume) as described above was sprayed by means of a conventional air sprayer onto sheet molding compound prepared as described above. The coating composition was uniformly dispersed and the film in the wet state as applied to SMC was 4 mils thick. The substrate was then subjected to a surface temperature of about 120° F. for 10 minutes which flashed off the water. Curing of the film occurred at about 350° F. for 20 minutes. Thereafter, the cured film had a hard finish, having a 2H pencil hardness. The cured film was subjected to a cross hatch adhesion test and 100% of the film was retained by the substrate.

An epoxy ester solvent type primer was then applied to the cured film and baked for 20 minutes at 325° F. (162.8° C.) and top coated with a nonaqueous dispersion of commercially available thermoset acrylic paint. The thus coated substrate was treated to an immersion and soap spot test without failure.

It is to be appreciated that the aqueous dispersion may also contain an effective conducting amount of a conductive filler to make the coating composition conductive. Suitable conductive fillers are graphite, carbon black, ferrophos, metallic pigments, as aluminum, zinc, and the like. The coating is made conductive so that the coated SMC would be conductive. This allows the use of electrostatic spraying techniques in subsequent applications of primer and top coat.

We claim:

1. An aqueous dispersion coating composition consisting essentially of an epoxy powder paint and a water carrier wherein the water carrier has dissolved therein a water soluble nonionic surfactant in an amount ranging from about 0.01 to about 10% by weight (PBW) of the dry epoxy material and a dispersing agent in an amount from about 0.01 to 10 PBW of the dry epoxy material, wherein the pigment volume concentration of the coating composition is at least 10.

2. The coating composition of claim 1 wherein the nonionic surfactant is an organic phosphate type.

3. The coating composition of claim 2 wherein the dispersing agent is an anionic polymeric dispersing agent.

4. The composition of claim 3 wherein the anionic dispersing agent is an acrylic acid containing composition.

5. The composition of claim 1 wherein the powder paint contains a cross-linking agent for an epoxy resin.

6. The composition of claim 5 wherein the cross-linking agent is a blocked isocyanate.

7. A method of coating formed fiber reinforced plastics comprising the steps;

1. applying an aqueous dispersion coating composition of claim 1 to the fiber reinforced plastic;
2. flashing off the water from the applied dispersion composition; and
3. curing the coating composition.

8. The method of claim 7 wherein the flashing off occurs at a temperature between 100° and 212° F.

9. The method of claim 8 wherein the curing occurs at a temperature from about 250° to about 400° F. for a period of time ranging from about 10 to 60 minutes.

10. The method of claim 7 wherein the formed fiber reinforced plastic is sheet molding compound.

11. The composition of claim 1 wherein the pigment volume concentration is about 35.

12. The composition of claim 1 wherein the pH of the composition ranges from about 8 to about 12.

13. The method of claim 7 wherein the coating composition has a pigment volume concentration is about 35.

14. The method of claim 7 wherein the coating composition has a pH ranging from about 8 to about 12.

* * * * *